United States Patent [19]

Colvert et al.

[11] Patent Number: 4,610,851

[45] Date of Patent: Sep. 9, 1986

[54] AIR DISTRIBUTOR FOR FCCU CATALYST REGENERATOR

[76] Inventors: James H. Colvert; Thomas A. Lionetti, both of P.O. Box 52332, Houston, Tex. 77052

[21] Appl. No.: 675,499

[22] Filed: Nov. 28, 1984

[51] Int. Cl.[4] .............................................. F27B 15/10
[52] U.S. Cl. .................................... 422/310; 422/144; 502/41; 34/57 R; 239/548; 239/288; 239/288.5
[58] Field of Search ............... 422/144, 178, 223, 310; 502/41; 34/57 R, 57 A; 239/548, 558, 288, 288.5, 520

[56] References Cited

U.S. PATENT DOCUMENTS 4,443,551  4/1984  Lionetti et al. ..................... 422/144

Primary Examiner—S. Leon Bashore
Assistant Examiner—Andrew J. Anderson

[57] ABSTRACT

An improved air ring for a regenerator in a fluid catalytic cracking process in which a baffle extends vertically downward from the air ring for a critical length. The baffle prevents catalyst erosion on the underside of the air ring and improves air distribution in the catalyst bed.

1 Claim, 3 Drawing Figures

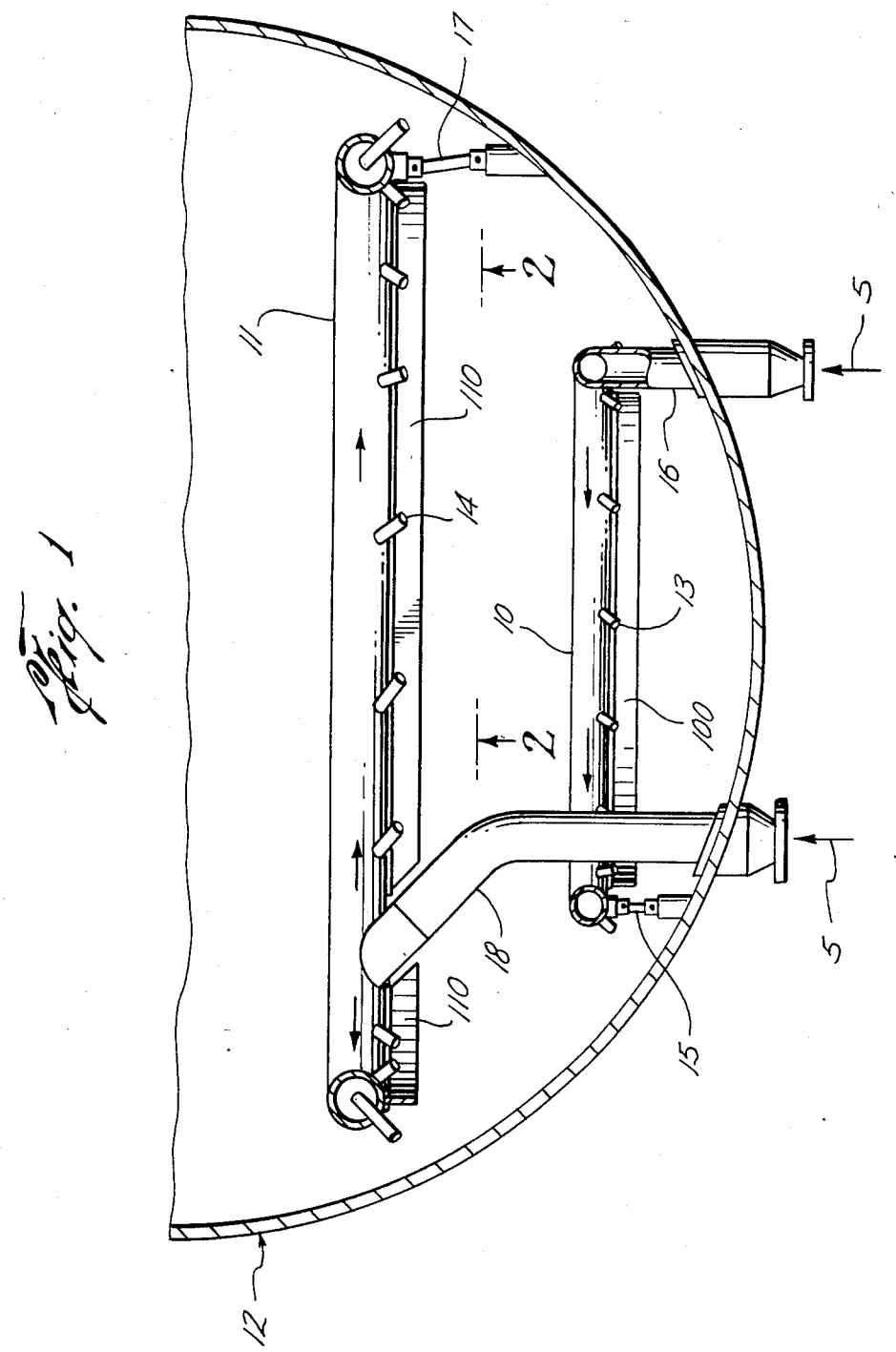

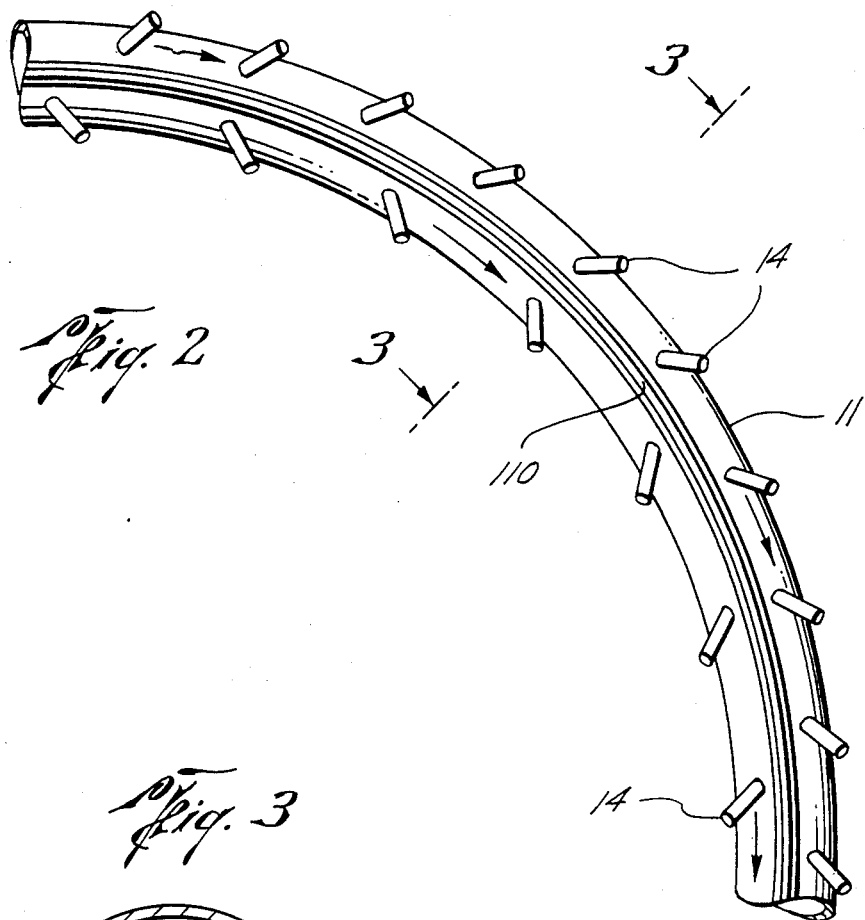
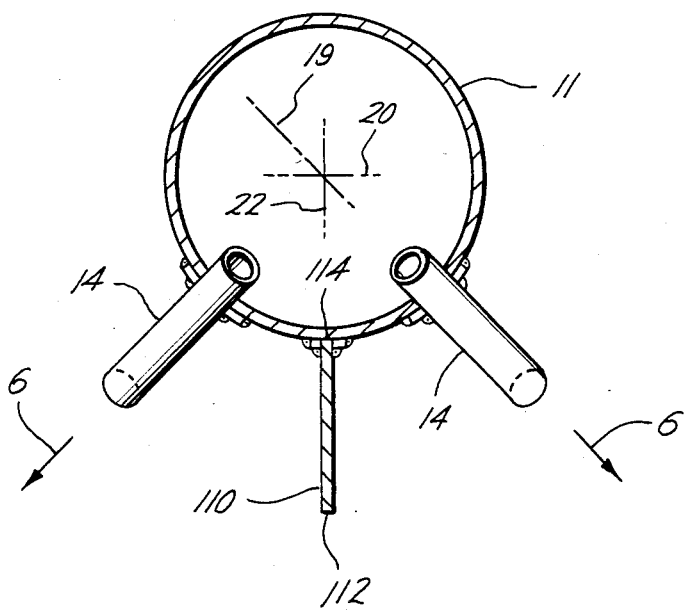

AIR DISTRIBUTOR FOR FCCU CATALYST REGENERATOR

BACKGROUND OF THE INVENTION

1. Field of the Invention

This invention is an improved air distributor apparatus in the catalyst regenerator of a fluid catalytic cracking process. More specifically, the invention is an improved air ring which comprises a baffle extending vertically downward into a zone of spent catalyst. The baffle prevents catalyst carried by high velocity air from eroding the under side of the air ring.

2. Description of the Prior Art

The present invention is an improvement in the regeneration of catalyst used in a fluid catalytic cracking process such as the process described in U.S. Pat. No. 3,433,733. In a fluid catalytic cracking process, a hydrocarbon is contacted with a fluidized solid catalyst within a reaction zone to effect conversion of at least a portion of the hydrocarbon to cracked products. One cracked product is coke which deposits on the outer surface of the catalyst, reversibly deactivating it. Catalyst with an outer layer of coke is continuously removed from the reaction zone and stripped of light hydrocarbon. Stripped catalyst is then passed to the dense phase of the regeneration zone. In this zone, coke deactivated catalyst is contacted with an oxygen-carrying gas, typically air supplied from an air distributor, to effect combustion of at least a portion of the deposited coke, thereby regenerating the catalyst. Regenerated catalyst is continuously withdrawn from the regeneration zone and introduced to the reaction zone.

BRIEF DESCRIPTION OF THE DRAWINGS

The drawing illustrates in several views a schematic representation of the present invention.

FIG. 1 is a schematic diagrammatic vertical sectional view of a portion of the horizontally positioned air distributor in the form of an air ring with baffle.

FIG. 2 is a schematic diagrammatic horizontal sectional view of a portion of the air ring and baffle combination taken at 2—2 on FIG. 1.

FIG. 3 is a section taken at 3—3 on FIG. 2.

DETAILED DESCRIPTION OF THE DRAWINGS

While various devices may be utilized for carrying out or practicing the above inventive methods, FIGS. 1-3 illustrate at least one inventive apparatus as herein described.

FIG. 1 shows the new distributors 10 and 11 for use in a regenerator 12 with nozzles 13 and 14, respectively, therein protruding from the air ring at an angle to the flow of air in the air ring. While circular ring shaped air distributors are shown for illustration, a non circular type may be utilized if so desired or required.

In the regenerator 12 of FIG. 1, inner air distribution ring 10 mounted therein on a plurality of struts, as strut 15 illustrated, and with high velocity air 5 through duct 16 mounted radially on the air ring 10 and supplied from air supply means (not shown) for passing the high pressure air to the air distribution ring 10 for being distributed around the bottom in the regenerator through the nozzles 13 for maintaining the catalyst fluidized in a fluidized bed.

Upper and outer air distribution ring 11 is likewise supported from the bottom of the regenerator with struts, such as with the illustrated strut 17 and connected to a high pressure air supply duct 18. Angled nozzles 14 are likewise mounted on outer air ring 11 at a 45° angle to the flow of air through the ring whereby the high pressure high velocity air makes a 45° angle change of direction prior to being ejected into and penetrating the catalyst fluidized bed.

Attached to the air distribution rings 10 and 11 are baffles 100 and 110 respectively. The baffles extend vertically downward from the air rings. In this position they retard the flow of maldistributed high velocity air ejected from the nozzles and catalyst carried therewith and thereby prevent erosion of the underside of the ring. Further, they improve global flow of catalyst in the regenerator.

FIG. 2, a section taken at 2—2 on FIG. 1, illustrates the position of the nozzles 14 on air supply ring 11 being between 30° and 75° and preferably between 45° and 60° from the direction of flow at the nozzle entrance so that the fluid flow is deviated 45°, for example, from the flow path in the ring 11.

From FIG. 2 as well as FIGS. 1 and 3 it is readily seen that high velocity air is ejected into the catalyst bed or zone in a generally downward direction. The ejection penetrates the bed and this penetration contains a vertically downward component.

FIG. 3, a section at 3—3 on FIG. 2 illustrates a nozzle 14 protruding from air ring 11 at an angle from a vertical plane through the air supply ring axis. This angle varies, depending on the particular air pressure and design requirements, but the nozzle lies in a plane through the central axis of the column of supply air at the nozzle.

The nozzles eject high velocity oxygen carrying gas 6 and thereby penetrate the bed to a depth dependent on gas velocity in the range of 100 to 200 ft/sec., catalyst bed density as well as other process parameters. By vector analysis of the gas penetration in the catalyst zone it is apparent that for every downward directed nozzle there is a vertical component to the penetration.

In the plane of section 3—3 are horizontal line 20 and vertical line 22. Line 19 is the central axis of nozzle 14. The baffle 110 extends at its upper end 114 to the underside of the air ring 11, and is firmly attached thereto, preventing flow under the air ring. The baffle 110 extends vertically downward to its lower end 112, such that the distance from 114 to 112 is at least $\frac{3}{4}$ of the vertical component of the penetration of high velocity gas 6 into the catalyst zone (not shown).

SUMMARY OF THE INVENTION

The invention is an improved air distributor apparatus for delivering a high velocity oxygen-carrying gas such as air to a zone of spent catalyst in a fluid catalytic cracking process. The air distributor comprises a horizontally positioned air ring into which is positioned a plurality of downward directed nozzles.

An air supply means supplies high velocity oxygen-carrying gas such as air to the air ring. The air ring contains a bore through which high velocity oxygen-carrying gas is flowed to a plurality of nozzles.

Each nozzle of the plurality contain a nozzle bore through which high velocity oxygen-carrying gas flows at a velocity of about 100 to 200 ft./sec. from the air ring bore to penetrate the zone of spent catalyst. Nozzles are positioned to direct the flow of high velocity oxygen-carrying gas downward thereby producing a vertical component to penetration.

In the air distributor apparatus the improvement comprises a baffle extending from the air ring vertically downward into the zone at least ¾ of the vertical component to penetration. The baffle prevents the horizontal flow of oxygen-carrying gas under the air ring, thereby preventing the erosion of the underside of the air ring by catalyst carried by high velocity oxygen-carrying gas which has penetrated the catalyst zone as well as improving the air distribution in the zone of spent catalyst.

DESCRIPTION OF THE PREFERRED EMBODIMENTS

A new apparatus has been invented for delivering a high velocity oxygen-carrying gas from air distributor to a zone of spent catalyst in a regenerator of a fluid catalytic cracking process. The apparatus is distinguished in comprising a baffle extending vertically downward from the air ring into the zone of spent catalyst. The baffle extends at least ¾ of the vertical component to oxygen-carrying gas penetration and preferably ¾ to 1¼ of the vertical component.

As stated, regenerated catalyst is continuously withdrawn from the regeneration zone and introduced to the reaction zone. To prompt an efficient regeneration, an even distribution of regeneration air is introduced into the lower portion of the dense phase of the regeneration zone. The efficiency of the regeneration process is dependent on the specific distribution of air through the spent catalyst zone. It has been found desirable to distribute the air outwardly from the air distributor at sufficient pressure differentials to cause the air to effectively distribute through the zone of spent catalyst. It has been found that the volume of air leaving the air distributor nozzles may be so unbalanced or unsteady between nozzles in the distributor at such desired pressure levels that air flows under the air ring at relatively high velocities which causes catalyst to impact against the air ring. The impact has resulted in severe external erosion on the underside of the air rings.

In one occurrence of this phenomenon, erosion occurred in the part of the regenerator where the spent catalyst entering the regenerator fell onto the air ring. It was thought that spent catalyst falling onto the outer part of the air ring restricted the flow of air upward and forced it under the ring. In some cases this erosion has resulted in air ring failures.

The solution to this problem of air ring failures was found experimentally. Movies were made of an air ring-baffle assembly. It was found from analysis of these movies that a baffle that extended for at least ¾ of the vertical penetration of the high velocity air was sufficient to prevent significant catalyst impact on the under side of the air ring. Therefore a baffle of at least ¾ vertical penetration was found experimentally to be critical in preventing erosion. Shorter baffles would produce less favorable results without yielding a significant economic incentive to make them so. Surprisingly, baffles of one penetration length did not completely stop the flow which caused erosion. It was found, critically, that a baffle of 1¼ vertical penetration stopped flow of the erosive type. Lengthening the baffles beyond 1¼ vertical penetration did not produce better results and could hinder the flow of catalyst causing relatively dead zones.

It was found experimentally that the baffles not only reduced local erosive flow in the case of the ¾ penetration baffle and completely stopped local erosive flow in the case of the 1¼ penetration baffle; but also, improved global catalyst flow within the regenerator vessel. The baffles seem to improve air distribution within the bed thereby improving catalyst regeneration. This is attributed to eliminating local high and low pressure pockets which cause air to flow in directions not intended in the design. The baffles force the air to flow more according to design models. This causes more uniform fluidization of the entire catalyst bed and more uniform contacting of coke contaminated catalyst with air.

EXAMPLE

Air rings were constructed as a result of the experimental work herein described. The air ring has a 42 inch cross-section diameter. The nozzles has a 1½ inch inlet i.d. and a 1.6 inch outlet i.d. The nozzles were of 6 to 7 inch length and extended 4 to 5 inches external from the air ring except in places where they extended 2 inches external from the air ring to accommodate the refractory. Design penetration into the bed was 12.8 inches. A 16 inch long baffle was attached to the air ring according to FIGS. 1, 2, and 3. The baffle was ⅜ inch thick and fabricated from 304 stainless steel, the same as the air ring. The air ring was installed in the regenerator of a fluid catalytic cracking unit and operated according to design.

The principle of the invention and the best mode contemplated for applying the principle have been described. It is to be understood that the foregoing is illustrative only and that other means and techniques can be employed without departing from the true scope of the invention defined in the following claims.

What is claimed is:

1. An improved air distributor apparatus for delivering a high velocity oxygen-carrying gas such as air to a zone of spent catalyst in a regenerator in a fluid catalytic cracking process comprising
   a horizontally positioned air ring comprising an underside and containing an air ring bore through which high velocity oxygen-carrying gas is flowed to a plurality of nozzles,
   said plurality of nozzles being further defined in that
   (i) each nozzle contains a nozzle bore of an inside diameter to flow high velocity oxygen-carrying gas at a velocity of about 100 to 200 ft./sec. from the air ring bore to penetrate the zone of spent catalyst,
   and (ii) each nozzle is positioned to direct the flow of high velocity oxygen-carrying gas downward thereby producing a vertical component to penetration;
   wherein the improvement comprises:
   a baffle extending from the air ring vertically downward an effective length to prevent the horizontal flow of oxygen-carrying gas directly under the air ring, thereby preventing the erosion of the underside of the air ring by the flow of spent catalyst carried by high velocity oxygen-carrying gas after penetrating the zone, thereby improving air distribution within the zone of spent catalyst.

* * * * *